March 26, 1929.  J. V. PUGH ET AL  1,706,542
CYCLE OR LIKE BRAKE
Filed July 2, 1926  2 Sheets-Sheet 1

J. V. Pugh & W. H. Whitmill
inventor

By: Marks & Clerk
Attys

March 26, 1929.  J. V. PUGH ET AL  1,706,542
CYCLE OR LIKE BRAKE
Filed July 2, 1926   2 Sheets-Sheet 2

J. V. Pugh & W. H. Whitmill
inventor

By: Marks & Clark
Attys

Patented Mar. 26, 1929.

1,706,542

UNITED STATES PATENT OFFICE.

JOHN VERNON PUGH AND WILLIAM HENRY WHITMILL, OF COVENTRY, ENGLAND, ASSIGNORS TO RUDGE-WHITWORTH, LIMITED, OF COVENTRY, ENGLAND.

CYCLE OR LIKE BRAKE.

Application filed July 2, 1926, Serial No. 120,186, and in Great Britain September 3, 1925.

This invention relates to cycle or like wheel brake mechanisms of that kind in which a brake handle or like actuating means is provided at each end of the handle bar and either brake handle may be used to apply two brakes to retard the movement of the cycle or the like.

The object of the invention is to provide an improved form of brake mechanism of the kind indicated.

The invention consists in a brake mechanism for cycles or the like in which a steering or handle bar is provided at each end with separate brake handles or like actuating means either of which is adapted independently to apply the same pair of brakes to the cycle or the like.

The invention further consists in a brake mechanism in accordance with the preceding paragraph in which a lever arm connected to and adapted simultaneously to operate two brake-applying means is engaged independently by two separate brake-actuating members either or both of which may optionally be employed to apply the brakes.

The invention further consists in a braking mechanism in accordance with the preceding paragraph in which the actuating members comprise levers disposed upon each side of the said lever arm and coaxial with the pivotal or rocking axis thereof.

The invention further consists in a brake mechanism as last indicated in which the coaxial actuating members constitute upon each side a pivotal support for the lever arm which operates the two brake-applying means.

The invention also consists in improvements in or relating to cycle breaks as hereinafter described.

Referring now to the accompanying drawings:—

Figure 1:
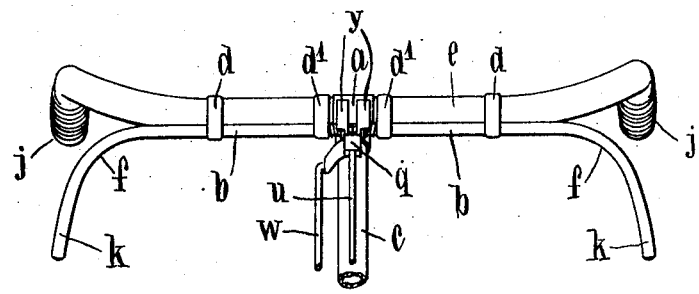
Figure 1 is a general front view of the handle bar and braking system.

One convenient way of carrying the invention into effect is shown in the drawings in which, referring to Figure 1, any known form of cycle handle bar having a forward junction lug $a$ is provided with brake-actuating means comprising two small shafts $b$, $b$, one being positioned upon each side of the central stem $c$ of the handle bar and each supported in pivotal or rotational bearings $d$, $d'$, $d'$ $d$ positioned just below and parallel with the horizontal portion $e$ of the handle bar cross piece.

Figure 3:
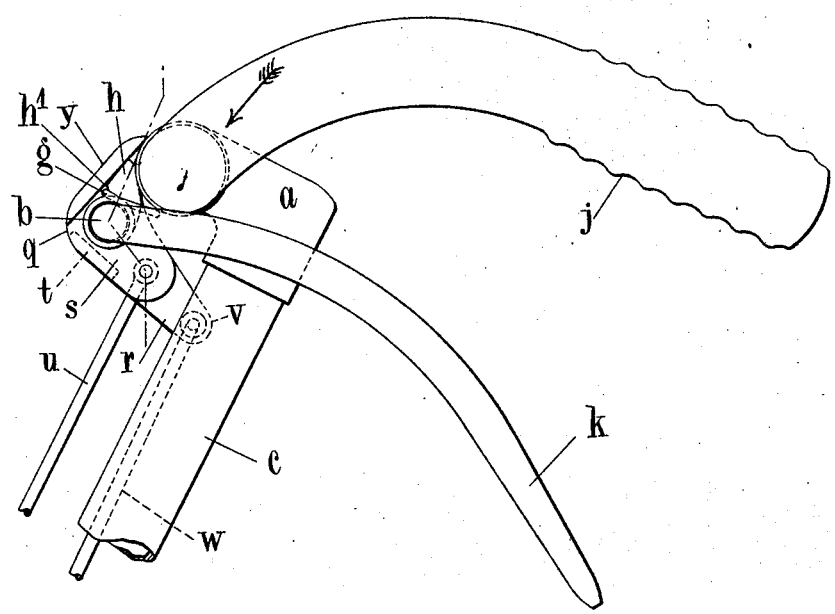
Figure 3 is a side view of the left-hand lever system and the actuating shaft, the pivotal bearings being removed for clearness.

Each of the shafts is turned round at its end, as shown at $f$ in Figures 1 and 3, and lies underneath the backwardly-turned handle portion of the handle bar and is set downward in the form of a handle $k$ at such a distance from the handle bar that when drawn upward in close proximity or contact therewith the straight part $b$ of the shaft is turned in its pivotal bearings through a moderate angular movement.

Figure 2:
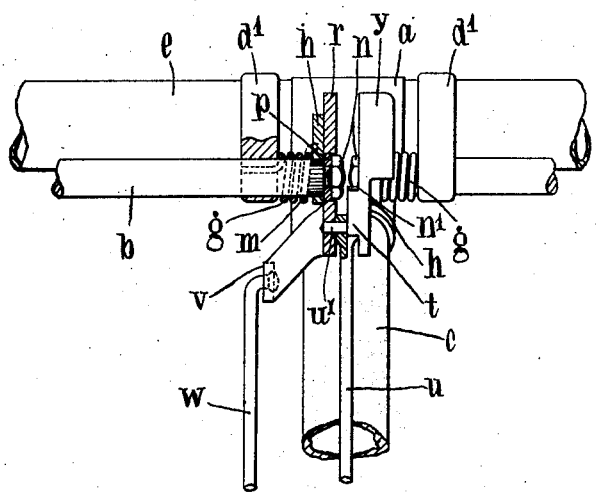
Figure 2 is a front view of the lever system in part section.

Beneath the forwardly-projecting portion of the handle bar junction lug $a$ the two shafts $b$, $b$ terminate closely adjacent to one another as shown in Figure 2 and each is provided adjacent to its end with a short lever $h$. These levers fit tightly over serrated portions $m$, $m$ on the ends of the shafts and are retained axially thereon by washers $p$ and the nuts $n$, $n$ which are screwed onto the reduced and threaded ends $n'$, $n'$ of the shafts. Each of the levers $h$ extends upwardly and contacts on its rear edge with the front of the junction lug $a$ and is engaged in a notch $h'$ on its other edge by one end of a spring $g$ (Figures 2 and 3) which is coiled around a short portion of the shaft between the lever $h$ and the nearest supporting bearing $d'$, the spring having its other end fastened to the said bearing and being adapted to exert a backward pressure upon the lever and keep it in contact with the junction lug $a$ and the brake handles $k$, $k$ in their off position and remote from the grips $j$, $j$ of the handle bar.

Figure 4:
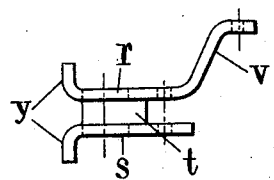
Figure 4 is a view in the direction of the arrow in Figure 3, showing the lever to which the brake-operating rods are connected.

Pivotally mounted upon the periphery of the washers $p$, $p$ which retain the levers $h$, $h$ on the shafts $b$, $b$, is a lever arm $q$ which operates the two brake-applying means fitted respectively to the front and rear wheels of the cycle. This lever arm, as shown in plan in Figure 4, is formed of two adjacent sides $r$ and $s$ having a substantially triangular configuration connected together by a transverse bottom part $t$, the nuts $n$, $n$ retaining the levers being close together in between the two adjacent sides as in Figure 2, and the backwardly-directed portions of these sides adjacent to the stem *c* forming a jaw projecting beyond the bottom part *t* wherein the front wheel brake rod *u* is connected by a pin *u'* just in front of the handle bar stem *c*. One of the sides *r* is continued backwards past this jaw and, following round the contour of the rounded stem *c* at a short clearance distance therefrom, terminates at about the centre of the side of the stem in an eye *v* forming the attachment means for the back wheel brake rod *w*.

Closely adjacent to the front edges of the levers *h, h* on the brake shafts *b, b* the front edges of the two sides *r* and *s* of the lever arm *q* are turned round outwards in front in opposite directions to form shoulders as shown at *y, y* in Figures 2 and 4, the top portions of these shoulders *y, y* being held in actual contact with the fronts of the levers *h, h* when the brakes are in the off position. This last condition is illustrated in Figure 3.

It will be seen that as either brake handle is drawn up, its corresponding shaft and upwardly directed actuating lever will be moved forward away from the junction lug and will press upon the shoulder *y* of the double-sided lever arm *q*, and in so doing will rock the arm about its pivotal axis and draw up the backwardly-directed ends thereof and apply both of the brakes through the rods *u* and *w*.

If the two-sided lever arm *q* is moved by means of one brake handle only, it will be drawn away from the short lever *h* of the other brake handle arm, and if additional power is required, both of the brake handles may be drawn up simultaneously causing both the levers at the ends of the shafts to act upon the central two-sided lever and transmit an additional force thereto.

It is to be understood that the constructive details are given by way of example only and that alterations and additions may be introduced without in any way departing from the spirit of this invention.

We claim:

1. Brake mechanism for cycles or the like comprising in combination a cycle steering handle bar, separate brake handles with rocker shafts at each end thereof, a pair of separate brake-applying members each adapted to actuate an independent brake, and means whereby each independent rocker shaft operates both said brake-applying members.

2. Brake mechanism for cycles or the like comprising in combination a cycle steering handle bar, separate brake handles with rocker shafts at each end thereof, a brake-applying member adapted to actuate one brake, a brake-applying member adapted to actuate another brake, a lever arm connected so as to move simultaneously both said brake-applying members, and operating elements on said rocker shafts capable of independently operating said lever arm.

3. Brake mechanism for cycles or the like comprising in combination a cycle steering handle bar, separate brake handles at each end thereof, rocker shafts coaxial with and extending towards each other from said brake handles, a brake-applying member adapted to actuate one brake, a brake-applying member adapted to actuate another brake, a lever arm pivoted coaxial with said rocker shafts connected so as to move simultaneously both said brake-applying members and operating elements on said rocker shafts capable of independently operating said lever arm.

4. Brake mechanism for cycles or the like comprising in combination a cycle steering handle bar, separate brake handles at each end thereof, rocker shafts extending coaxially towards each other from said brake handles, a brake-applying member adapted to actuate one brake, a brake-applying member adapted to actuate another brake, a lever arm mounted to pivot on the adjacent ends of said rocker shafts connected so as to move simultaneously both said brake-applying members and operating lever elements on said rocker shafts capable of independently operating said lever arm.

5. Brake mechanism for cycles or the like comprising in combination a cycle steering handle bar, separate brake handles at each end thereof, rocker shafts extending coaxially towards each other from said brake handles, a brake-applying member adapted to actuate one brake, a brake-applying member adapted to actuate another brake, a lever arm mounted to pivot on the adjacent ends of said rocker shafts connected so as to move simultaneously both said brake-applying members, operating lever elements on said rocker shafts capable of independently operating said lever arm, and return means comprising springs encircling portions near the adjacent ends of the rocker shafts and engaging a notch or the like on one edge of the corresponding lever elements.

6. A braking mechanism having two brake-applying means for alternatively or jointly moving a lever arm to apply a brake to each of two wheels of a vehicle, in which the lever arm connected to the two brake-applying means comprises two side portions of substantially triangular outline arranged adjacent, opposite and parallel to one another and having two corresponding edges turned round outwardly in opposite directions, and a transverse bottom portion connecting said side portions, the said outwardly-turned edges forming shoulders or abutments through one or both of which torque is applied to the said lever arm from the actuating lever or levers about the common pivotal axis.

7. A braking mechanism having a lever arm for applying two brakes and which is pivotally mounted upon alternative actuating means upon each side thereof, in which the lever arm connected to the two brake-applying means is pivotally mounted, at each of its two side portions, upon the periphery of a washer or like means retaining actuating levers upon shafts by which they are operated.

8. A braking mechanism as claimed in claim 6, in which the lower parts of said triangular portions extend rearwards towards the stem of the handle bar, the transverse bottom portion being partly cut away or slotted to provide a jaw for accommodating one of the brake rods and one of said triangular portions being extended still further so as to follow the contour of the rounded stem at a convenient clearance therefrom and accommodating at its end the other brake rod.

In testimony whereof we have signed our names to this specification.

JOHN VERNON PUGH.
WILLIAM HENRY WHITMILL.